United States Patent [19]

Holt et al.

[11] 4,103,849
[45] Aug. 1, 1978

[54] CATAPULT RESTRAINT/RELEASE SYSTEM

[75] Inventors: Lloyd J. Holt; Clayton E. Panlaqui, both of Ridgecrest, Calif.

[73] Assignee: The United States of America as represented by the Secretary of the Navy, Washington, D.C.

[21] Appl. No.: 833,415

[22] Filed: Sep. 15, 1977

[51] Int. Cl.² .................. B64F 1/04; B64F 1/16
[52] U.S. Cl. .................. 244/63; 24/211 P; 294/83 R; 403/15; 403/31
[58] Field of Search .......... 244/63, 3, 114 R, 115; 403/15, 31, 37, 322, 360; 294/83 R, 83 A, 95; 60/583, 51; 24/230.5, 211 P; 72/238

[56] References Cited

U.S. PATENT DOCUMENTS

| | | | |
|---|---|---|---|
| 2,432,508 | 12/1947 | Cotton | 244/63 |
| 2,444,919 | 7/1948 | Cotton et al. | 244/3 |
| 2,449,554 | 9/1948 | Helber et al. | 60/51 |
| 2,647,776 | 8/1953 | Wallis | 244/63 |
| 2,707,119 | 4/1955 | Bobbick | 403/31 |
| 2,727,291 | 12/1955 | Hamblin | 24/230 S |
| 2,728,538 | 12/1955 | Mazis | 244/63 |
| 2,777,650 | 1/1957 | Fosness et al. | 244/63 |
| 2,783,004 | 2/1957 | Fieux | 244/63 |
| 3,062,485 | 11/1962 | Hartel | 244/63 |
| 3,370,811 | 2/1968 | Boody | 244/63 |
| 3,437,291 | 4/1969 | Bockman, Jr. | 244/63 |
| 3,578,273 | 5/1971 | Mulgrave | 244/115 |
| 3,602,461 | 8/1971 | Cody et al. | 244/63 |
| 3,738,693 | 6/1973 | Loustalet | 24/211 P |
| 3,813,065 | 5/1974 | Hallesy et al. | 244/115 |
| 3,945,235 | 3/1976 | Oxlade et al. | 72/238 |
| 4,072,348 | 2/1978 | Auer | 24/211 P |

*Primary Examiner*—Galen L. Barefoot
*Attorney, Agent, or Firm*—R. S. Sciascia; Roy Miller; Thomas W. Hennen

[57] ABSTRACT

Apparatus for restraining an aircraft against the combined forces of a catapult launching shuttle and aircraft takeoff power during a catapult assisted takeoff until a predetermined combined force level has been reached. Release of the aircraft is triggered by the relative movement of a central piston within a housing which causes disengagement of gripping lugs from a tensile bar attached to the aircraft. The relative movement is enabled by the compressibility of hydraulic oil confined within the apparatus and loaded by the combined forces.

6 Claims, 1 Drawing Figure

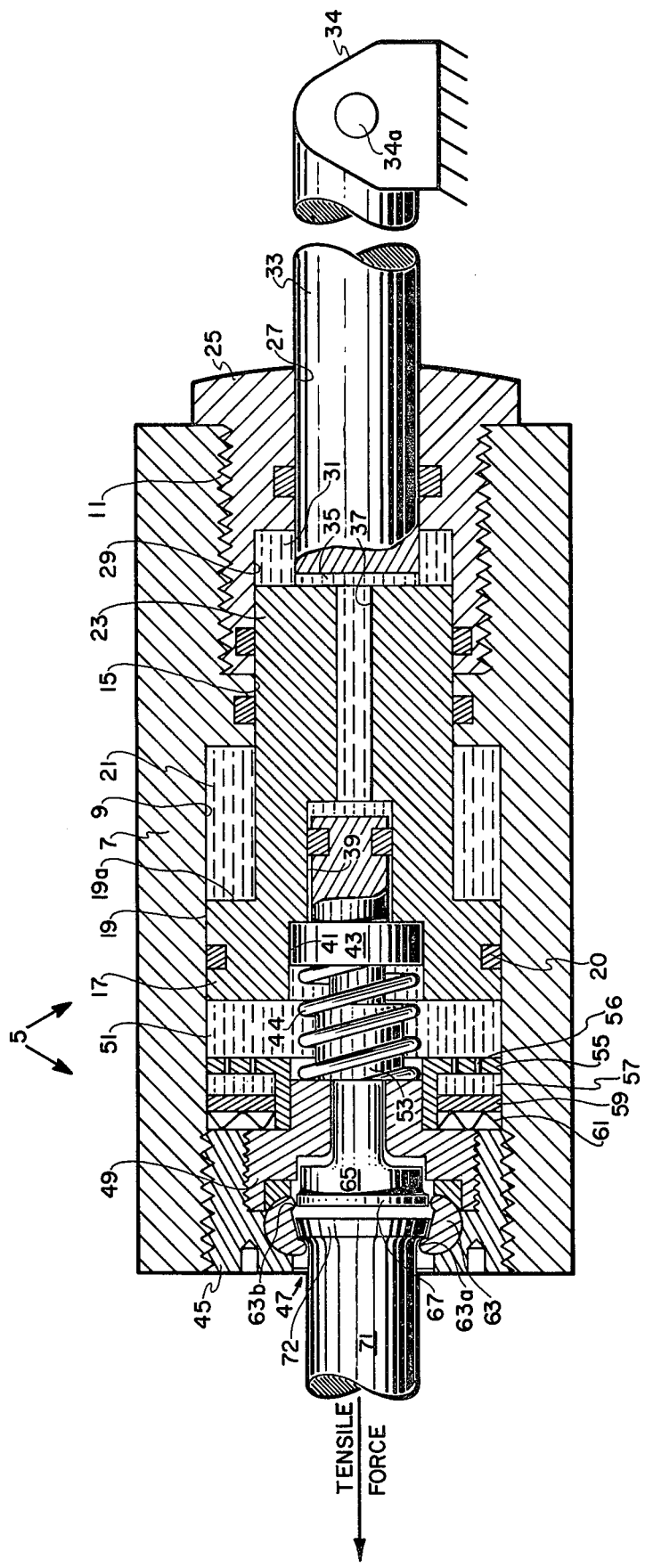

CATAPULT RESTRAINT/RELEASE SYSTEM

BACKGROUND OF THE INVENTION

1. Field of the Invention.

This invention pertains to force activated releasable restraint devices and more particularly to such devices which restrain aircraft prior to catapult assisted take-offs.

2. Description of the Prior Art

Modern highspeed aircraft operating from aircraft carrier decks require assistance in reaching their minimum flying speed when attempting to take off. This assistance may take the form of a steam powered catapult or the like. In such catapult assisted launches the aircraft must be restrained while pressure in the catapult is built up and jet engines reach full power. Also, powerful jet engines in takeoff power condition may create thrust which exceeds the capacity of the wheel brakes. When catapult pressure is up, and engine power full, the restraint device must release quickly and cleanly.

Prior devices have used expendible tensile links which part at a predetermined force level. These devices are limited in that a new link is required for each launch, expended links clutter the deck and create a foreign object hazard to personnel and deck machinery, and can be ingested by jet engines. The tensile links are expensive to manufacture and store, and are worthless after one use. Also, each different type aircraft requires a different strength tensile link.

One reusable restraint device is described in U.S. Pat. No. 3,578,273, issued May 11, 1971 to Thomas Mulgrave. This device uses a spring biased ball valve to trigger release of gripping fingers from structure attached to an aircraft. Hydraulic pressure caused by application of launching forces eventually unseats the spring biased ball, and hydraulic fluid escapes to permit movement of a piston relative to a housing. This movement in turn causes release of the gripping fingers from structure attached to the aircraft. This device is different from the present invention as will be explained in a description which follows.

The Mulgrave device has the advantage of being reusable, but in order to change the force level at which release occurs, the ball valve bias spring must be either replaced with a different strength spring, or the preload on the spring must be changed. This is necessary to accomodate aircraft of different masses which require different launching forces to achieve adequate acceleration to reach minimum flying speed from limited deck lengths.

SUMMARY OF THE INVENTION

The present invention overcomes the limitations of the prior art by providing a reusable restraint/release system that is calibrated by controlling the volume of a slightly compressible hydraulic fluid within a compression chamber. Linear movement of a first piston, made possible by compression of the hydraulic fluid in the compression chamber, causes displacement of hydraulic fluid from a second chamber to act against the face of a second piston which occupies a cylinder which is concentrically located within the first piston. Movement of this second piston permits disengagement of latching lugs from structure attached to the aircraft or catapult shuttle and the aircraft takeoff run begins.

BRIEF DESCRIPTION OF THE DRAWING

The single FIGURE of the drawing is a side view partially in section and partially schematic taken along the longitudinal axis of a restraint/release device according to the present invention.

DESCRIPTION OF THE PREFERRED EMBODIMENT

A restraint/release device according to the present invention is indicated generally by the reference numeral 5 on the drawing. The device includes housing 7 having major bore 9 and threaded minor bore 11. Connecting bore 15 is smaller in diameter than bore 9 and joins bores 9 and 11. Bushing 25 may be considered part of housing 7 and has central bore 27 which is smaller than bore 15, and counter bore 29. All bores in housing 7 are concentric.

Plunger 17 has a concentrically stepped configuration defined by large end 19, middle region 23, and plunger shaft 33. Housing 7 and plunger 17 define an annular fluid compression chamber 21. Bushing 25 occupies threaded bore 11 and receives plunger shaft 33 within central bore 27, while receiving middle region 23 of plunger 17 within counter bore 29. The diameter of counterbore 29 corresponds to the diameter of connecting bore 15. Counterbore 29, plunger shaft 33 and middle region 23 define fluid displacement chamber 31. Plunger shaft 33 is attached to the runway surface in a rigid or pivotably rigid manner as shown by bracket 34 and pivot pin 34a.

Fluid displacement chamber 31 communicates with plunger bore 37 through crossbore 35. Plunger 17 also has stepped counterbores 39 and 41 which are concentric with plunger bore 37. Headed piston 43 fits within stepped counterbores 39 and 41 and bears against operating plunger 65.

Threaded bushing 45 closes major bore 9 and is suitably bored and counter bored to receive and retain latching mechanism 47 and adapter bushing 49. Surge chamber 51 and a snubber assembly occupy the space between plunger 17 and threaded bushing 45. The snubber assembly includes baffle plate 55 which has fluid orifices 56, and sliding annular piston 59 and rebound spring 61. Baffle plate 55 and sliding annular piston 59 define secondary surge chamber 57. Baffle plate 55 is fastened to adapter bushing 49 with weld, braze, an interference fit, threads, adhesive, or any other suitable fastening means.

Bias spring 44 bears against adapter bushing 49 and headed piston 43 and may be guided over part of its length by spacer bushing 53 which also prevents piston 43 from leaving its bore. Seals such as illustrated at 20 are conventional hydraulic fluid seals such as O-rings, and are used where necessary to prevent leakage of hydraulic fluid.

Latch assembly 47 comprises a plurality of locking lugs 63 arranged in a toroidal space in bushing 45. Operating plunger 65 has locking head 67 which operates lugs 63. When coupled to an aircraft or catapult shuttle by tension bar 71, lugs 63 are in the position shown in the drawing, nubs 63a gripping bar 71 at tapered shoulder 72, and locked by the position of locking head 67 against nubs 63b. When the device releases, operating plunger 65 moves slightly in the direction of bar 71 so that nubs 63b are not retained by head 67 but may move inward. As this happens tapered shoulder 72 forces nubs 63a outward, pivoting locking lugs 63 and releasing bar 71.

The device may be manually unlatched and released, for example, by hydraulically or pneumatically exerting pressure on displacement chamber 31. Pressure could be applied by using a check valve fitting and passageway through bushing 25 or elsewhere to connect chamber 31 with a source of compressed gas or pressurized fluid. Any mechanical means of moving locking plunger 65 toward bar 71 would also serve to release the device.

The level of force required to cause release is adjusted by controlling the volume of fluid within compression chamber 21. A greater volume of fluid within chamber 21 will compress and permit a given travel distance of plunger 17 at a lower applied tensile force than will a lesser volume. Also, as the volume of fluid in chamber 21 is changed, plunger 17 moves, displacing fluid from chamber 31, or causing fluid to flow into displacement chamber 31. Thus the dimensions of chambers 21 and 31 must be sized so that as plunger 17 moves during calibration, operating plunger 65 maintains its position relative to latch assembly 47.

OPERATION

The restraint/release device is assembled as shown by the drawing and attached between the aircraft carrier deck and the aircraft or catapult shuttle by bar 71 for example. Chambers 21, 31 and 51 are filled with a suitable hydraulic fluid. As power is applied by the catapult and aircraft engines, tensile force is applied along the longitudinal axis of the device by bar 71 which transmits this force to housing 7. Plunger shaft 33 is held stationary by the attachment to the deck at 34. Fluid in chamber 21 is thus pressurized. As tensile force on bar 71 increases, fluid in chamber 21 compresses, permitting plunger 17 to approach displacement chamber 31. As this movement takes place fluid is displaced from chamber 31 and flows through bores 35 and 37 to force headed piston 43 against operating plunger 65. When fluid in chamber 21 reaches its preselected compression state, about 5% by volume, operating plunger 65 is forced sufficiently toward bar 71 by displaced fluid that head 67 releases nubs 63b and the aircraft begins its takeoff. Plunger 17 travel is approximately one centimeter (0.4 in)

In one actual test of this invention calibrated for a 70,000 lb thrust at release, the face 19a of plunger 17 was about 45 square centimeters (7 square inches) and chamber 21 was about 25.4 centimeters (10 inches) in length. At release, pressure in chamber 21 was about 69 Pascals (10,000 lbs/sq. in.).

At the moment of release, a shock recoil reaction occurs which can be destructive if not countered. At the beginning of the cycle, as the device is being loaded and plunger 17 is moving toward chamber 31, expelling chamber 51 expands, drawing fluid through orifices 56 from receiving chamber 57 under the urging of spring 61 against resiliently biased wall 59. This continues until the moment of release. At release, as energy stored in fluid compressed in chamber 21 is released, the fluid expands to its unloaded volume and reduced pressure, and plunger 17 is forced toward bushing 45. Fluid in expelling chamber 51 is thereby pumped through orifices 56 in apertured plate 55 into receiving chamber 57. Energy released is dissipated by controlled fluid flow through orifices 56, the number and size of which are selected to accomodate the physical properties of the fluid used, and the shock loads to be dissipated.

After release, the head 67 of operating plunger 65 remains forward and out of contact with headed piston 43 until forced aft by the next insertion of a bar 71, at which time the mechanism grips the new bar for the next launch.

Obviously, many modifications and variations of the present invention are possible in the light of the above teachings. It is therefore to be understood that within the scope of the appended claims the invention may be practiced otherwise than as specifically described.

What is claimed is:

1. Apparatus for releasably restraining an aircraft prior to launch comprising:
    a housing having a concentrically stepped central bore defined by a large diameter bore at a first end joined to a small diameter bore at a second end by an intermediate diameter bore;
    a concentrically stepped plunger having first and second ends, and defined by a large diameter section at said first end joined to an elongated small diameter section at said second end by an intermediate diameter section;
    said plunger occupying said stepped central bore in sealing relationship with said housing and said elongated small diameter section extending from said housing through said small diameter bore;
    said second end of said plunger having means for attachment to a stationary object;
    said housing and plunger defining an annular compression chamber and an annular displacement chamber;
    said plunger defining a bore communicating with said annular displacement chamber and extending to said plunger first end;
    a compressible liquid filling said annular compression and displacement chambers and partially filling said plunger bore;
    a piston sealingly engaging said plunger bore and being motion responsive to displacement of liquid from said annular displacement chamber;
    a mechanism operative to releasably grip structure attached to an aircraft, said mechanism being attached to said first end of said housing, and said mechanism being operative to release said grip in response to movement of said piston; and
    means for dissipating energy from fluid in said compression chamber in response to said mechanism releasing said grip.

2. Apparatus as set forth in claim 1 wherein said compressible liquid is hydraulic oil.

3. Apparatus as set forth in claim 1 wherein said mechanism comprises:
    a plurality of pivoting lugs, pivotable between a gripping position and a release position, arranged toroidally about an opening, said lugs each having gripping nubs for gripping a headed bar, and locking nubs for locking said lugs in said gripping position; and
    an operating plunger having a locking head and an axially adjacent region of reduced diameter, said operating plunger being concentric with said opening and constrained to axial motion between locking and freeing positions in response to movement of said piston;
    said locking head bearing against said locking nubs when said locking plunger is in said locking position, and said reduced diameter region being adjacent said locking nubs when said locking plunger is in said freeing position.

4. Apparatus as set forth in claim 1 wherein said means for dissipating energy comprises:
said first end of said plunger, said housing, and said mechanism defining a liquid surge chamber;
an apertured plate rigidly attached to said mechanism and dividing said liquid surge chamber into an expelling chamber and a receiving chamber;
said receiving chamber having a resiliently biased wall; and
said expelling and receiving chambers containing a compressible liquid.

5. Apparatus as set forth in claim 1 including resilient biasing means for biasing said piston against movement caused by fluid pressure of liquid displaced from said displacement chamber.

6. Apparatus as set forth in claim 5 wherein said resilient biasing means is a coil spring.

* * * * *